United States Patent
Zhou

(10) Patent No.: US 11,981,841 B2
(45) Date of Patent: May 14, 2024

(54) SEALANT STRUCTURE AND METHOD OF FABRICATING DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Mingjun Zhou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 912 days.

(21) Appl. No.: 16/616,983

(22) PCT Filed: Aug. 7, 2019

(86) PCT No.: PCT/CN2019/099609
§ 371 (c)(1),
(2) Date: Nov. 26, 2019

(87) PCT Pub. No.: WO2021/012317
PCT Pub. Date: Jan. 28, 2021

(65) Prior Publication Data
US 2021/0122942 A1    Apr. 29, 2021

(30) Foreign Application Priority Data

Jul. 22, 2019 (CN) .......................... 201910658856.0

(51) Int. Cl.
*C09J 7/10* (2018.01)
*B32B 37/04* (2006.01)
*B32B 37/12* (2006.01)

(52) U.S. Cl.
CPC ................. *C09J 7/10* (2018.01); *B32B 37/04* (2013.01); *B32B 37/1292* (2013.01);
(Continued)

(58) Field of Classification Search
CPC ...... C09J 7/10; C09J 2427/00; C09J 2431/00; C09J 2433/00; C09J 2477/00;
(Continued)

(56) References Cited

U.S. PATENT DOCUMENTS

2013/0070180 A1    3/2013   Kuriyama
2016/0341870 A1    11/2016  Xie et al.
(Continued)

FOREIGN PATENT DOCUMENTS

CN    101881909 A    11/2010
CN    102879935 A    1/2013
(Continued)

*Primary Examiner* — Daniel H Lee
(74) *Attorney, Agent, or Firm* — PV IP PC; Wei Te Chung; Zhigang Ma

(57) ABSTRACT

A sealant structure and a method of fabricating a display panel are provided. The sealant structure includes a plurality of adhesive strips, and the adhesive strips overlap end to end to form a closed loop. Ends of at least one of any two adjacent adhesive strips are provided with an overlap region, and a width of the overlap region is less than or equal to one third of a width of the adhesive strip provided with the overlap region.

10 Claims, 3 Drawing Sheets

(52) U.S. Cl.
CPC ... *B32B 2037/1253* (2013.01); *B32B 2457/20* (2013.01); *C09J 2427/00* (2013.01); *C09J 2431/00* (2013.01); *C09J 2433/00* (2013.01); *C09J 2477/00* (2013.01); *C09J 2481/00* (2013.01)

(58) Field of Classification Search
CPC .............. C09J 2481/00; C09J 2203/318; C09J 2301/204; C09J 7/30; B32B 37/04; B32B 37/1292; B32B 2037/1253; B32B 2457/20; B32B 37/0076; B32B 37/1284; G09F 9/00
See application file for complete search history.

(56) References Cited

U.S. PATENT DOCUMENTS

2018/0004028 A1    1/2018   Lu
2019/0369443 A1   12/2019   Cho et al.

FOREIGN PATENT DOCUMENTS

| | | |
|---|---|---|
| CN | 102918576 A | 2/2013 |
| CN | 103869526 A | 6/2014 |
| CN | 204127794 U | 1/2015 |
| CN | 104536167 A | 4/2015 |
| CN | 104679339 A | 6/2015 |
| CN | 204405997 U | 6/2015 |
| CN | 204479886 U | 7/2015 |
| CN | 104817968 A | 8/2015 |
| CN | 205033697 U | 2/2016 |
| CN | 105467690 A | 4/2016 |
| CN | 105834083 A | 8/2016 |
| CN | 206219443 U | 6/2017 |
| CN | 206863397 U | 1/2018 |
| CN | 207123690 U | 3/2018 |
| CN | 207172893 U | 4/2018 |
| CN | 207232580 U | 4/2018 |
| CN | 207711397 U | 8/2018 |
| CN | 207924326 U | 9/2018 |
| CN | 108803158 A | 11/2018 |
| CN | 208935908 U | 6/2019 |
| JP | 2015142965 A  * | 8/2015 |
| KR | 101510855 B1 | 4/2015 |

* cited by examiner

SEALANT STRUCTURE AND METHOD OF FABRICATING DISPLAY PANEL

CROSS REFERENCE TO RELATED APPLICATION

This application claims the priority of International Application No. PCT/CN2019/099609, filed on 2019 Aug. 7, which claims priority to Chinese Application No. 201910658856.0, filed on 2019 Jul. 22. The entire disclosures of each of the above applications are incorporated herein by reference.

BACKGROUND OF INVENTION

Field of Invention

The present invention relates to the field of electronic display, and in particular, to a sealant and a method of fabricating a display panel.

Description of Prior Art

In the prior art, a body and a cover glass of a display panel are usually bonded by thermoplastic glues, which are flexible solids at room temperature and have a low viscosity. Adhesive strips of thermoplastic glues can be melted after being heated and solidified to a high viscosity solid after the temperature is lowered. In the prior art, for a display panel having a rectangular structure, in order to save cost, the adhesive strips for bonding display panel are usually formed by four spliced adhesive strips. As frame width of the display panels is gradually reduced, width of the adhesive strips is also reduced, therefore higher requirements are imposed on stitching precision of the adhesive strips.

Technical Problems

Referring to FIG. 1, if gaps between the adhesive strips are too large, the melted adhesive strips would not be able to fill the gaps, which may result in the display panel being unsealed. If overlap area of the adhesive strips overlap is too large, the adhesive strips in the overlap area would be too thick to melt completely and form a splicing gap, which may also result in the display panel being unsealed.

SUMMARY OF INVENTION

In order to solve the above problems, the present application provides a sealant structure and a method of fabricating a display panel to solve the technical problem that the display body and the cover plate cannot be sealed.

The application provides a sealant structure, wherein the sealant structure comprises a plurality of adhesive strips, the adhesive strips overlap end to end to form a closed loop;

wherein ends of at least one of any two adjacent adhesive strips are provided with an overlap region, and a width of the overlap region is less than or equal to one third of a width of the adhesive strip provided with the overlap region.

According to one aspect of the application, wherein the adhesive strips have a same width.

According to one aspect of the application, wherein each overlap region has a length greater than or equal to twice the width of the adhesive strip provided with the overlap region.

According to one aspect of the application, wherein each overlap region has a length less than or equal to four times the width of the adhesive strip provided with the overlap region.

According to one aspect of the application, wherein the sealant structure is rectangular, adhesive strips forming the sealant structure comprises a first adhesive strip, a second adhesive strip, a third adhesive strip, and a fourth adhesive strip;

wherein the first adhesive strip, the second adhesive strip, the third adhesive strip and the fourth adhesive strip overlap end to end to form a closed loop, the first adhesive strip and the fourth adhesive strip are oppositely disposed, and the second adhesive strip and the third adhesive strip are oppositely disposed.

According to one aspect of the application, wherein a first end and a second end of the first adhesive strip are provided with an overlap region respectively, a first end of the second adhesive strip covers one overlap region and a first end of the third adhesive strip covers another overlap region;

wherein a first end and a second end of the fourth adhesive strip are provided with an overlap region respectively, a second end of the second adhesive strip covers one overlap region and a second end of the third adhesive strip covers another overlap region.

According to one aspect of the application, wherein a first end of the first adhesive strip, a first end of the second adhesive strip, a first end of the third adhesive strip, and a first end of the fourth adhesive strip are provided with an overlap region respectively;

wherein a second end of the first adhesive strip overlaps with the first end of the second adhesive strip, a second end of the second adhesive strip overlaps with the first end of the fourth adhesive strip, a second end of the fourth adhesive strip overlaps with the first end of the third adhesive strip, a second end of the third adhesive strip overlaps the first end of the first adhesive strip.

According to one aspect of the application, wherein two ends of the first adhesive strip, two ends of the second adhesive strip, two ends of the third adhesive strip, and two ends of the fourth adhesive strip are provided with an overlap region respectively, the overlap regions of any two adjacent adhesive strips are overlapped.

According to one aspect of the application, wherein a material forming the adhesive strips is a thermoplastic adhesive.

According to one aspect of the application, wherein the thermoplastic adhesive is selected from a combination of one or more of polyvinyl acetate, polyvinyl acetal, ethylene-vinyl acetate copolymer resin, vinyl chloride-vinyl acetate copolymer resin, perchloroethylene resin, polyacrylate, polyamide and polysulfone.

The present application further provides a method of fabricating a display panel, wherein the method comprises the steps of:

providing a display body, the display body comprising a display area and a non-display area surrounding the display area;

providing a plurality of adhesive strips on the non-display area, the adhesive strips overlap end to end to form a closed loop, wherein ends of at least one of any two adjacent adhesive strips are provided with an overlap region, a width of the overlap region is less than or equal to one third of a width of the adhesive strip provided with the overlap region;

pressing a cover plate on the adhesive strips and heating the adhesive strips to cause the adhesive strips melt and deform to form an adhesive unit;

cooling and curing the adhesive unit to form a sealed space by the cover plate and the display body.

Beneficial Effects

The present application optimizes shape of the adhesive strips which are provided with an overlap region, and a width of the overlap region is less than or equal to one third of a width of the adhesive strip provided with the overlap region. In this arrangement, the overlapping area of two adjacent adhesive strips is reduced to one third of the prior art, thereby the overlap area of the adhesive strips is effectively reduced and incomplete melting generated by uneven heating is prevented. At the same time, a length of the overlap region is much larger than a width of a strip and the tolerance range is large, therefore, the requirement of alignment precision of the adhesive strips is low, which is convenient for pasting. The technical solution of the present application can optimize the sealing effect of the display panel without increasing the difficulty of the process.

DETAILED DESCRIPTION OF PREFERRED EMBODIMENTS

Figure 1:
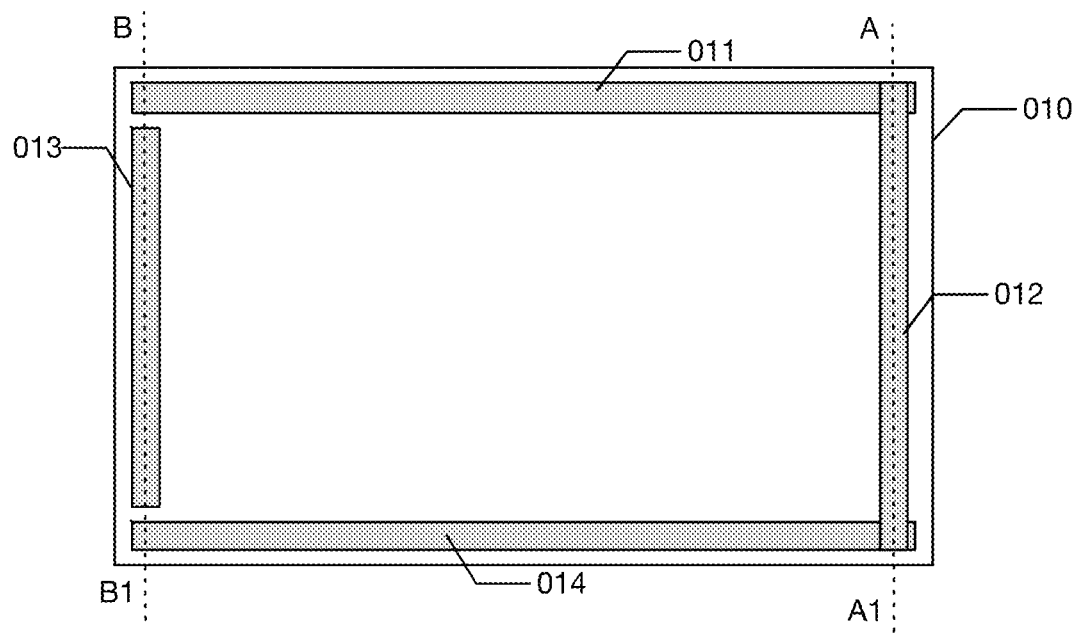
FIG. 1 is a structural diagram of a display body and a sealant structure in the prior art.

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

First, the prior art will be briefly described. Referring to FIG. 1, a display panel includes a substrate 010 and a first adhesive strip 011, a second adhesive strip 012, a third adhesive strip 013, and a fourth adhesive strip 014 on the substrate 010. The first adhesive strip 011, the second adhesive strip 012, the third adhesive strip 013, and the fourth adhesive strip 014 are disposed around edges of the substrate 010.

In the prior art, the adhesive strips are thermoplastic glues, which are flexible solids at room temperature and have a low viscosity. Adhesive strips of thermoplastic glues can be melted after being heated and solidified to a high viscosity solid after the temperature is lowered. Because the adhesive strips are soft and susceptible to deformation during splicing, when pasted onto the substrate 010, lengths of the adhesive strips are easily changed by an external force, thereby generating gaps or overlapping between adjacent adhesive strips.

Figure 2:
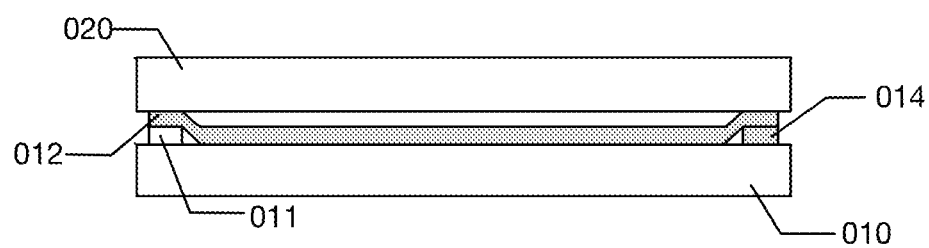
FIG. 2 is a cross-sectional view taken along a direction of AA1 in FIG. 1.
Figure 3:
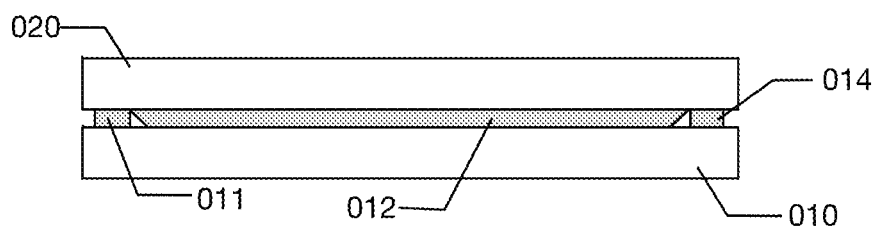
FIG. 3 is a cross-sectional view of a display panel after adhesive strips in FIG. 2 are fused.

Referring to FIG. 2, the second adhesive strip 012 overlaps with the adjacent first adhesive strip 011 and the fourth adhesive strip 014. Widths of overlapping regions are equal to widths of the first adhesive strip 011 and the fourth adhesive strip 014. When bonding with a cover plate 020, thicknesses of the overlap regions are too thick, resulting in uneven heat distribution of the adhesive strips. The adhesive strips near the overlap regions cannot be melted, forming an air passage between adjacent adhesive strips, as shown in FIG. 3.

Figure 4:
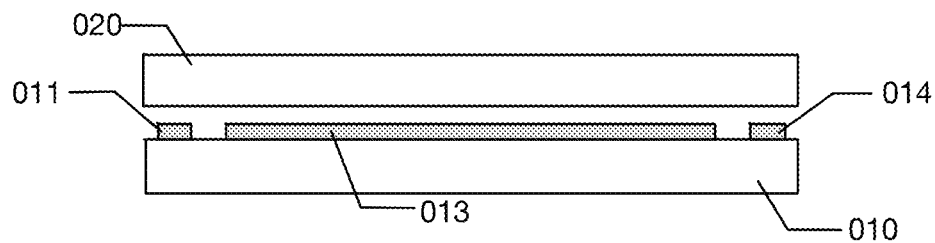
FIG. 4 is a cross-sectional view taken along a direction of BB1 of FIG. 1.
Figure 5:
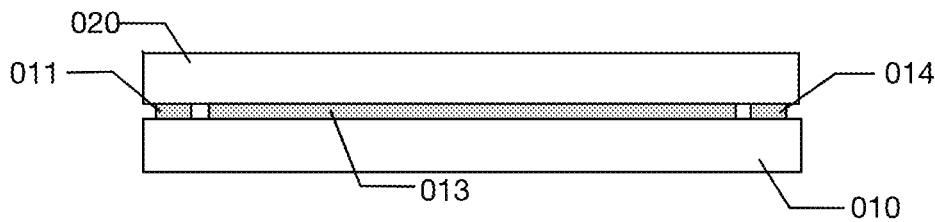
FIG. 5 is a cross-sectional view of a display panel after adhesive strips in FIG. 4 are fused.

Referring to FIG. 4, large gaps exist between the third adhesive strip 013 and the first adhesive strip 011 and the fourth adhesive strip 014 adjacent to the third adhesive strip 013. Because widths of the gaps are too large, the melted adhesive strips cannot completely fill the gaps, resulting in an air passage between adjacent adhesive strips, as shown in FIG. 5.

In order to solve the above problems, the present application provides a sealant structure and a method of fabricating a display panel to solve the technical problem that the display body and the cover plate cannot be sealed.

Figure 6:
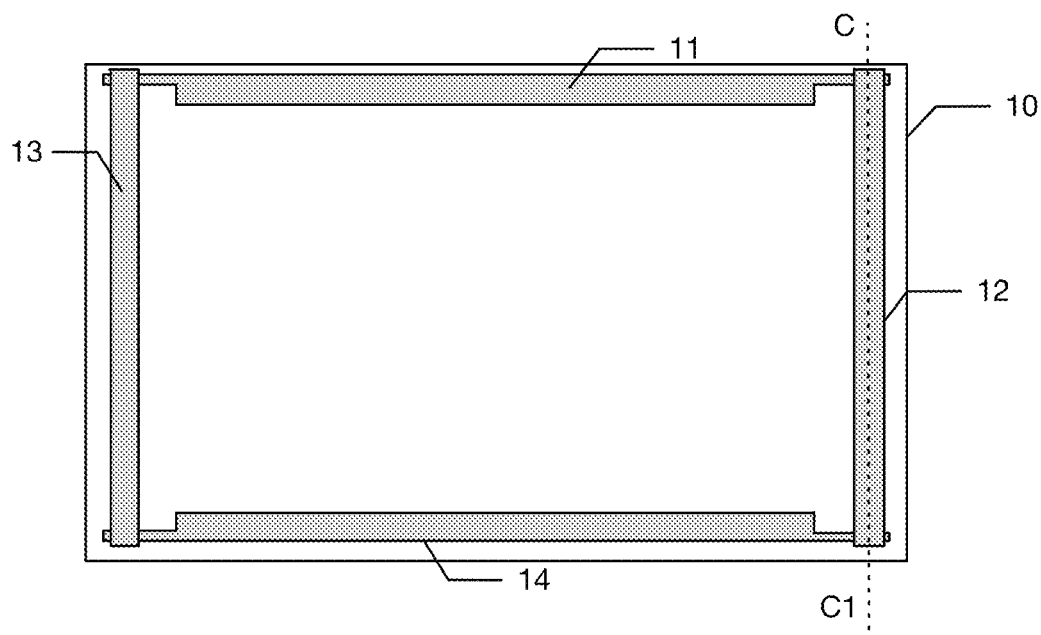
FIG. 6 is a structural diagram of a display panel and adhesive strips in a first embodiment of the present application.
Figure 7:
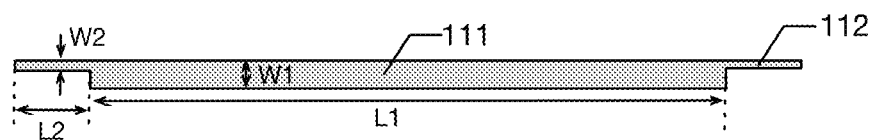
FIG. 7 is a structural diagram of a first adhesive strip.
Figure 8:
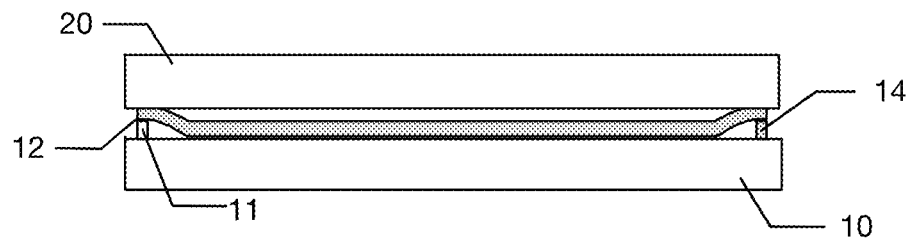
FIG. 8 is a cross-sectional view taken along a direction of CC1 of FIG. 6.

Referring to FIG. 6, FIG. 7, and FIG. 8, FIG. 6 is a structural diagram of a display panel and adhesive strips in a first embodiment of the present application. FIG. 7 is a structural diagram of a first adhesive strip. FIG. 8 is a cross-sectional view taken along a direction of CC1 of FIG. 6. The present application provides a sealant structure for bonding a display body 10 and a cover plate 20 constituting a display panel.

The display body 10 includes a display area and a non-display area surrounding the display area. An adhesive unit is disposed on the non-display area. The cover plate 20 is attached to the display body 10 by the adhesive unit consisting of the sealant structure, and forms a sealed space with the display body 10.

The sealant structure includes a plurality of adhesive strips, and the plurality of adhesive strips overlap end to end to form a closed loop. Different display panels have different shapes, and a shape of the corresponding sealant structure is also different. Correspondingly, a number of adhesive strips constituting the sealant structure is also different. Generally, for a mainstream rectangular display panel, the number of the adhesive strips is four, corresponding to the four sides of the display panel. At the same time, in order to avoid the adhesive strips from being deformed, widths of the adhesive strips are usually one-third to one-quarter of the width of the non-display area.

In the present application, ends of at least one of any two adjacent adhesive strips are provided with an overlap region, and a width of the overlap region is less than or equal to one third of a width of the adhesive strip provided with the overlap region.

In the present application, a material forming the adhesive strips is a thermoplastic adhesive, wherein the thermoplastic adhesive is selected from a combination of one or more of polyvinyl acetate, polyvinyl acetal, ethylene-vinyl acetate copolymer resin, vinyl chloride-vinyl acetate copolymer resin, perchloroethylene resin, polyacrylate, polyamide and polysulfone.

In this embodiment, in order to simplify the process and save costs, the adhesive strips have a same width. At the same time, in order to increase the fault tolerance rate when sticking the adhesive strips, each overlap region has a length greater than or equal to twice the width of the adhesive strip provided with the overlap region. In this way, even if the adhesive strip is deformed by the external force during pasting, the widths of the adhesive strips in the overlap region can be ensured to be one-third of the width of the strip, thereby reducing the requirement for pasting precision and reducing process difficulty. At the same time, in order to prevent the adhesion of the adhesive strips from being weakened, in this embodiment, each overlap region has a length less than or equal to four times the width of the adhesive strip provided with the overlap region.

In this embodiment, a rectangular sealant structure is taken as an example for description. Correspondingly, a number of the adhesive strips is four. It should be noted that the shape of the sealant structure and the number of adhesive strips in the present embodiment are only for explaining the present invention and are not to be construed as limiting the present invention.

The sealant structure is rectangular, adhesive strips forming the sealant structure comprises a first adhesive strip 11, a second adhesive strip 12, a third adhesive strip 13, and a fourth adhesive strip 14. Wherein, the first adhesive strip 11, the second adhesive strip 12, the third adhesive strip 13, and the fourth adhesive strip 14 overlap end to end to form a closed loop, the first adhesive strip 11 and the fourth adhesive strip 14 are oppositely disposed, and the second adhesive strip 12 and the third adhesive strip 13 are oppositely disposed.

Comparing FIG. 2 with FIG. 8, it can be seen that because the widths of the adhesive strips of the overlap regions are less than or equal to one third of the width of the adhesive strip provided with the overlap region, the overlap regions of the two adhesive strips overlapped in this application are less than or equal to one-third of the prior art. Since the overlapping area is significantly reduced, heat transfer efficiency of the adhesive strips at the overlap regions are greatly increased, thus the adhesive strips can be heated uniformly, and the air passages generated in the prior art due to the inability of the adhesive strips to melt at the overlap regions are eliminated.

Referring to FIG. 6, a first end and a second end of the first adhesive strip 11 are provided with an overlap region respectively, a first end of the second adhesive strip 12 covers one overlap region and a first end of the third adhesive strip 13 covers another overlap region. Wherein, a first end and a second end of the fourth adhesive strip 14 are provided with an overlap region respectively, a second end of the second adhesive strip 12 covers one overlap region and a second end of the third adhesive strip 13 covers another overlap region.

Referring to FIG. 7, the first adhesive strip 11 will be described as an example. The first adhesive strip 11 includes an adhesive strip 111 and two overlap regions 112 at opposite ends of the adhesive strip 111. The adhesive strip has a width W1 and a length L1. The overlap region has a width of W2 and a length of L2. To ensure an area of the overlap region generated when the first adhesive strip 11 overlaps with the second adhesive strip 12 and the third adhesive strip 13 less than or equal to one-third of the overlap area in the prior art, the width W2 of the overlap region is less than or equal to one third of the width W1 of the strip. At the same time, in order to reduce the requirement for pasting precision and reducing process difficulty, the length L2 of the overlap region is greater than or equal to twice the width W1 of the strip. At the same time, since the width of the overlap region is small, the adhesion of the corresponding overlap region is also small. In order to prevent the cover plate 20 from falling off due to decrease in the adhesion of the strip, the length L2 of the overlap region is less than or equal to four times the width W1 of the strip.

Figure 9:
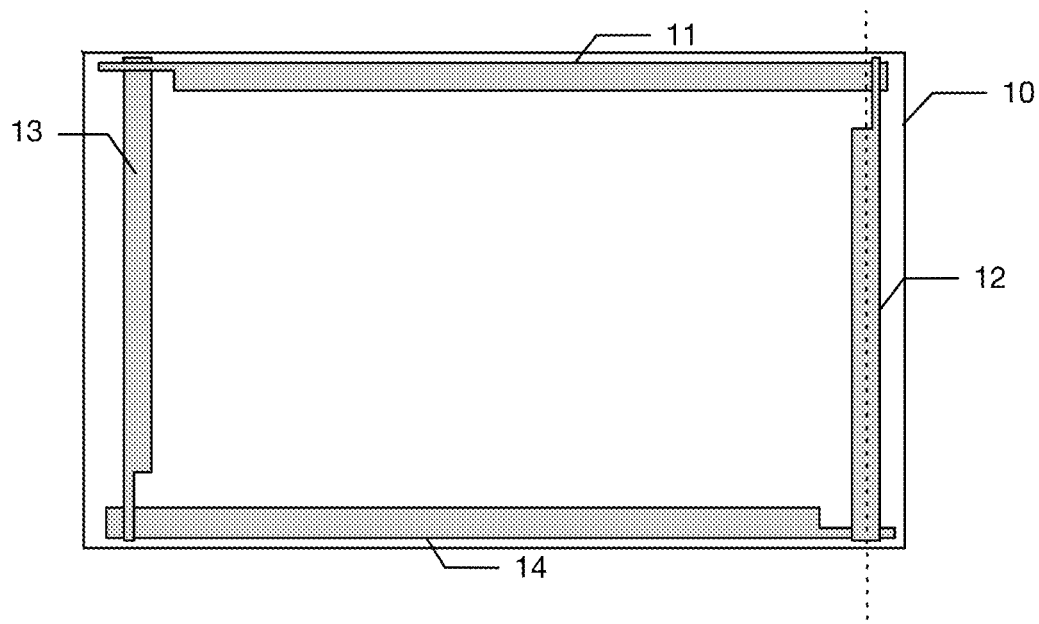
FIG. 9 is a structural diagram of a display panel and adhesive strips in a second embodiment of the present application.

Referring to FIG. 9, a second embodiment of the present application is shown. Wherein, a first end of the first adhesive strip 11, a first end of the second adhesive strip 12, a first end of the third adhesive strip 13, and a first end of the fourth adhesive strip 14 are provided with an overlap region respectively. Wherein, a second end of the first adhesive strip 11 overlaps with the first end of the second adhesive strip 12, a second end of the second adhesive strip 12 overlaps with the first end of the fourth adhesive strip 14, a second end of the fourth adhesive strip 14 overlaps with the first end of the third adhesive strip 13, and a second end of the third adhesive strip 13 overlaps the first end of the first adhesive strip 11. In this embodiment, shapes of the four adhesive strips are same, and each adhesive strip is provided with an overlap region. At this time, the four adhesive strips have same shape and size, and can be cut by a same module, thereby reducing the process complexity of cutting and pasting adhesive strips.

Figure 10:
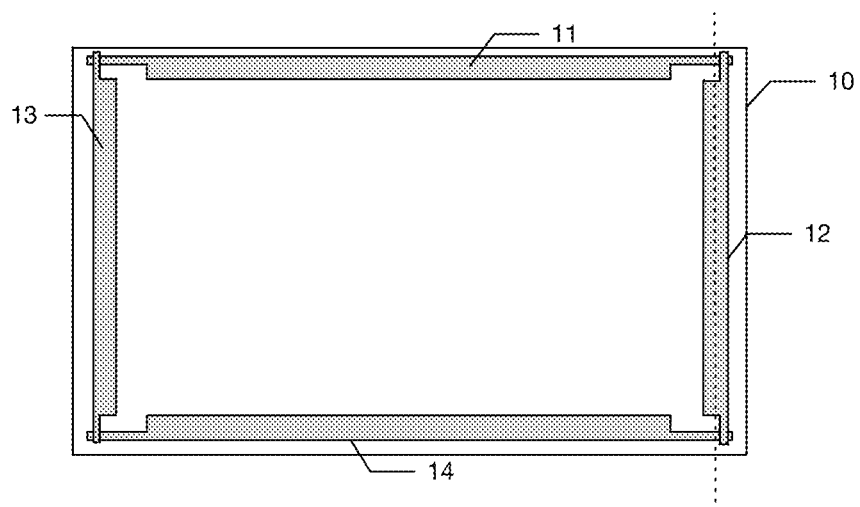
FIG. 10 is a structural diagram of a display panel and adhesive strips in a third embodiment of the present.

Referring to FIG. 10, a third embodiment of the present application is shown. Wherein, two ends of the first adhesive strip 11, two ends of the second adhesive strip 12, two ends of the third adhesive strip 13, and two ends of the fourth adhesive strip 14 are provided with an overlap region respectively, the overlap regions of any two adjacent adhesive strips are overlapped. In this embodiment, the overlapping areas of the overlap regions of two adjacent adhesive strips are less than or equal to one-ninth of the overlapping area in the prior art, making the overlapping adhesive strips more susceptible to heat uniformity. Not only the heat uniformity of the adhesive strips is enhanced, but also the time required for the adhesive strips to melt is reduced.

The present application further provides a method of fabricating a display panel, wherein the method comprises the steps of:

providing a display body 10, the display body comprising a display area and a non-display area surrounding the display area;

providing a plurality of adhesive strips on the non-display area, the adhesive strips overlap end to end to form a closed loop, wherein ends of at least one of any two adjacent adhesive strips are provided with an overlap region, a width of the overlap region is less than or equal to one third of a width of the adhesive strip provided with the overlap region;

pressing a cover plate 20 on the adhesive strips and heating the adhesive strips to cause the adhesive strips melt and deform to form an adhesive unit; and cooling and curing the adhesive unit, so that a sealed space is formed by the cover plate 20 and the display body 10.

The present application optimizes shape of the adhesive strips which are provided with an overlap region, and a width of the overlap region is less than or equal to one third of a width of the adhesive strip provided with the overlap region. In this arrangement, the overlapping area of two adjacent adhesive strips is reduced to one third of the prior art, thereby the overlap area of the adhesive strips is effectively reduced and incomplete melting generated by uneven heating is prevented. At the same time, a length of the overlap region is much larger than a width of a strip and the tolerance range is large, therefore, the requirement of alignment precision of the adhesive strips is low, which is convenient for pasting. The technical solution of the present application can optimize the sealing effect of the display panel without increasing the difficulty of the process.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A sealant structure, wherein the sealant structure comprises a plurality of adhesive strips, and the adhesive strips overlap end to end to form a closed loop defining a closed area;
   wherein one of two adjacent adhesive strips of the adhesive strips is provided with an overlap region and a non-overlap region adjacent to the overlap region, the overlap region is disposed at at least one end of the one of the two adjacent adhesive strips, and a width of the overlap region is less than or equal to one third of a width of the non-overlap region; and
   wherein in a direction of a length of the other of the two adjacent adhesive strips, an end of the other of the two adjacent adhesive strips overlapping with the overlap region of the one of the two adjacent adhesive strips protrudes from an outer edge of the non-overlap region of the one of the two adjacent adhesive strips, and the outer edge of the non-overlap region of the one of the two adjacent adhesive strips is away from the closed area;
   wherein at least one of the adjacent adhesive strips is a cutout adhesive strip comprising at least one rectangular cutout defined in an inner side of the end of the cutout adhesive strip in the overlap region such that the width of the overlap region of the cutout adhesive strip is less than the width of the non-overlap region of the cutout adhesive strip, wherein the inner side of the cutout adhesive strip faces the other one of the adjacent adhesive strips.

2. The sealant structure according to claim 1, wherein the adhesive strips have a same width.

3. The sealant structure according to claim 1, wherein the overlap region has a length greater than or equal to twice the width of the non-overlap region.

4. The sealant structure according to claim 1, wherein the overlap region has a length less than or equal to four times the width of the non-overlap region.

5. The sealant structure according to claim 1, wherein the sealant structure is rectangular, the adhesive strips forming the sealant structure comprise a first adhesive strip, a second adhesive strip, a third adhesive strip, and a fourth adhesive strip;
   wherein the first adhesive strip, the second adhesive strip, the third adhesive strip, and the fourth adhesive strip overlap end to end to form the closed loop, the first adhesive strip and the fourth adhesive strip are oppositely disposed, and the second adhesive strip and the third adhesive strip are oppositely disposed.

6. The sealant structure according to claim 5, wherein a first end and a second end of the first adhesive strip are provided with the overlap regions respectively, a first end of the second adhesive strip covers one overlap region at the first end of the first adhesive strip, and a first end of the third adhesive strip covers another overlap region at the second end of the first adhesive strip;
   wherein a first end and a second end of the fourth adhesive strip are provided with the overlap regions respectively, a second end of the second adhesive strip covers one overlap region at the first end of the fourth adhesive strip, and a second end of the third adhesive strip covers another overlap region at the second end of the fourth adhesive strip.

7. The sealant structure according to claim 5, wherein a first end of the first adhesive strip, a first end of the second adhesive strip, a first end of the third adhesive strip, and a first end of the fourth adhesive strip are provided with the overlap regions respectively;
   wherein a second end of the first adhesive strip overlaps with the first end of the second adhesive strip, a second end of the second adhesive strip overlaps with the first end of the fourth adhesive strip, a second end of the fourth adhesive strip overlaps with the first end of the third adhesive strip, and a second end of the third adhesive strip overlaps with the first end of the first adhesive strip.

8. The sealant structure according to claim 5, wherein two ends of the first adhesive strip, two ends of the second adhesive strip, two ends of the third adhesive strip, and two ends of the fourth adhesive strip are provided with the overlap regions respectively, and the overlap regions of the two adjacent adhesive strips are overlapped.

9. The sealant structure according to claim 1, wherein a material forming the adhesive strips is a thermoplastic adhesive.

10. The sealant structure according to claim 9, wherein the thermoplastic adhesive is selected from a combination of one or more of polyvinyl acetate, polyvinyl acetal, ethylene-vinyl acetate copolymer resin, vinyl chloride-vinyl acetate copolymer resin, perchloroethylene resin, polyacrylate, polyamide and polysulfone.

* * * * *